(12) United States Patent
Sun et al.

(10) Patent No.: US 12,518,342 B2
(45) Date of Patent: Jan. 6, 2026

(54) INFORMATION PROCESSING APPARATUS AND METHOD, ELECTRONIC DEVICE AND COMPUTER READABLE MEDIUM

(71) Applicant: Sony Group Corporation, Tokyo (JP)

(72) Inventors: Chen Sun, Beijing (CN); Xin Guo, Beijing (CN); Lingming Kong, Beijing (CN)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 18/331,953

(22) Filed: Jun. 9, 2023

(65) Prior Publication Data

US 2023/0316459 A1 Oct. 5, 2023

Related U.S. Application Data

(63) Continuation of application No. 17/092,392, filed on Nov. 9, 2020, now Pat. No. 11,715,177, which is a
(Continued)

(30) Foreign Application Priority Data

Sep. 29, 2017 (CN) .......................... 201710912367.4

(51) Int. Cl.
*G06T 15/20* (2011.01)
*G06F 16/432* (2019.01)
(Continued)

(52) U.S. Cl.
CPC .......... *G06T 3/4038* (2013.01); *G06F 16/434* (2019.01); *G06F 18/23* (2023.01);
(Continued)

(58) Field of Classification Search
CPC ....... G06T 15/205; G06T 15/20; G06T 13/20; G06T 7/73; G06T 7/70; G06T 1/0007; G06T 1/00; G06T 17/05; G06T 3/40
(Continued)

(56) References Cited

U.S. PATENT DOCUMENTS 8,413,206 B1 * 4/2013 Wyatt .............. H04N 21/25866
725/23
9,110,988 B1 * 8/2015 Tan ........................ G06F 16/783
(Continued)

FOREIGN PATENT DOCUMENTS

CN 102157011 A 8/2011
CN 105049727 A 11/2015
(Continued)

*Primary Examiner* — Daquan Zhao
(74) *Attorney, Agent, or Firm* — XSENSUS LLP

(57) ABSTRACT

The present disclosure relates to an information processing apparatus and method, an electronic device and computer readable medium. According to an embodiment, an information processing apparatus includes processing circuitry configured to compare environment data acquired by a user equipment with reference data; determine, based on the comparison, an adjustment for an acquisition manner of the environment data; and perform a control to notify the user equipment of indication information related to the adjustment.

23 Claims, 13 Drawing Sheets

Related U.S. Application Data continuation of application No. 16/014,353, filed on Jun. 21, 2018, now abandoned.

(51) Int. Cl.

| | | |
|---|---|---|
| *G06F 18/23* | (2023.01) | |
| *G06F 18/25* | (2023.01) | |
| *G06Q 20/06* | (2012.01) | |
| *G06Q 20/32* | (2012.01) | |
| *G06T 3/4038* | (2024.01) | |
| *G06T 7/73* | (2017.01) | |
| *G06T 13/20* | (2011.01) | |
| *G06T 17/05* | (2011.01) | |
| *G06V 10/10* | (2022.01) | |
| *G06V 20/13* | (2022.01) | |
| *G06T 1/00* | (2006.01) | |

(52) U.S. Cl.
CPC ......... *G06F 18/251* (2023.01); *G06Q 20/065* (2013.01); *G06Q 20/3224* (2013.01); *G06Q 20/3272* (2013.01); *G06T 7/74* (2017.01); *G06T 15/205* (2013.01); *G06T 17/05* (2013.01); *G06V 10/17* (2022.01); *G06V 20/13* (2022.01)

(58) Field of Classification Search
USPC .................................... 348/61, 135, 137, 42
See application file for complete search history.

(56) References Cited

U.S. PATENT DOCUMENTS

| | | | |
|---|---|---|---|
| 2005/0225567 | A1* | 10/2005 | Saito .................... H04N 7/0122 |
| | | | 348/E5.111 |
| 2010/0205035 | A1 | 8/2010 | Baszucki et al. |
| 2011/0013810 | A1 | 1/2011 | Engström et al. |
| 2013/0141588 | A1 | 6/2013 | Crookham et al. |
| 2014/0210941 | A1 | 7/2014 | Wang |
| 2014/0368600 | A1 | 12/2014 | Do et al. |
| 2015/0117676 | A1* | 4/2015 | Li ........................... H03G 3/20 |
| | | | 381/107 |
| 2016/0259992 | A1* | 9/2016 | Knodt .................... H04N 23/64 |
| 2016/0337596 | A1* | 11/2016 | Miura .................. H04N 23/667 |
| 2018/0286099 | A1* | 10/2018 | Kozloski .................. G06T 1/60 |

FOREIGN PATENT DOCUMENTS

| | | |
|---|---|---|
| CN | 105306921 A | 2/2016 |
| CN | 107103645 A | 8/2017 |

* cited by examiner

INFORMATION PROCESSING APPARATUS AND METHOD, ELECTRONIC DEVICE AND COMPUTER READABLE MEDIUM

CROSS-REFERENCE TO RELATED APPLICATIONS

This application is a continuation of U.S. application Ser. No. 17/092,392, filed Nov. 9, 2020, which is a continuation of U.S. application Ser. No. 16/014,353, filed Jun. 21, 2018 (now abandoned), which claims priority to Chinese Patent Application No. 201710912367.4, filed on Sep. 29, 2017, the entire contents of each are incorporated herein by its reference.

FIELD

The present disclosure generally relates to the field of information processing, and particularly to an information processing apparatus, an information processing method, an electronic device and an information processing method for user equipment side, and a computer readable medium.

BACKGROUND

An existing user equipment is capable of acquiring various environment data, such as video data and audio data, and is capable of uploading the acquired environment data to a server, etc. For example, a smart phone can capture an image and may upload the image to a social network, etc. In addition, it is possible that multiple users capture a same scenario or event.

SUMMARY

In the following, a brief overview of the present invention is given to provide a basic understanding to some aspects of the present invention. It should be understood that this overview is not an exhaustive overview of the present invention. It is neither intended to determine a critical part or an important part of the present invention, nor to limit the scope of the present invention. The object of the overview is only to give some concepts in a simplified manner, which serves as a preface of a more detailed description described later.

According to an embodiment, an information processing apparatus is provided, including processing circuitry configured to: compare environment data acquired by a user equipment with reference data; determine, based on the comparison, an adjustment for an acquisition manner of the environment data; and perform a control to notify the user equipment of indication information related to the adjustment.

According to another embodiment, an information processing method includes: comparing environment data acquired by a user equipment with reference data; determining, based on the comparison, an adjustment for an acquisition manner of the environment data; and performing a control to notify the user equipment of indication information related to the adjustment According to yet another embodiment, an information processing method includes: receiving environment data associated with a scenario and acquired by multiple user equipments, the environment data acquired by the multiple user equipments being at least partially different; determining the scenario; and fusing, based on the determined scenario, the environment data acquired by the multiple user equipments to generate scenario information.

According to still another embodiment, an electronic device for user equipment side is provided, including processing circuitry configured to perform a control to acquire environment data; transmit the acquired environment data to a control node; and receive, from the control node, indication information related to an adjustment of an acquisition manner of the environment data, where the adjustment being determined based on a comparison between the environment data and reference data.

According to yet another embodiment, an information processing method for user equipment side includes: acquiring environment data; transmitting the acquired environment data to a control node; and receiving, from the control node, indication information related to an adjustment of an acquisition manner of the environment data, where the adjustment being determined based on a comparison between the environment data and reference data.

Embodiments of the present disclosure also include a computer readable medium including executable instructions that, when executed by an information processing apparatus, cause the information processing apparatus to perform the methods according to the embodiments of the present disclosure.

According to the embodiments of the present disclosure, the effect of acquiring environment data can be improved.

BRIEF DESCRIPTION OF THE DRAWINGS

The present invention can be better understood with the detailed description made in the following taken in conjunction with accompanying drawings in which identical or like reference signs designate identical or like components. The accompanying drawings, together with the detailed description below, are incorporated into and form a part of the specification, which is used to further illustrate preferred embodiments of the present invention and explain the principle and advantages of the present invention. In the accompanying drawings.

DETAILED DESCRIPTION OF THE EMBODIMENTS

Figure 1:
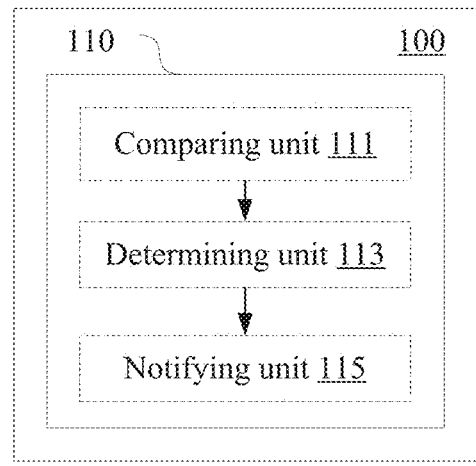
FIG. 1 is a block diagram showing a configuration example of an information processing apparatus according to an embodiment of the present disclosure.

Embodiments of the present disclosure are described with reference to the drawings. An element or feature described in a drawing or embodiment may be combined with an element or feature illustrated in one or more other drawings or embodiments. It is noted that, for clarity, some indication and description of parts or processes which are irrelevant to the present invention or well known by those skilled in the art are omitted in the drawings and description.

Referring to FIG. 1, an information processing apparatus 100 according to the present embodiment includes processing circuitry 110. The processing circuitry 110 may be implemented with a particular chip, a chip set, a central processing unit (CPU), or the like.

The information processing apparatus 100 may be implemented as a logic entity on network side. As an example rather than a limitation, the logic entity on network side includes, for example, a background server of a data sharing website, etc. Alternatively, the information processing apparatus 100 may also be implemented on user equipment side, e.g., a processing apparatus in a local area network formed by some user equipments. As an application example, in a case where several users form a network to perform game operations, a game pad may serve as a data collecting apparatus for a user, and a game console may serve as a central processing apparatus.

The processing circuitry 110 includes a comparing unit 111, a determining unit 113 and a notifying unit 115. It should be noted that, although the comparing unit 111, the determining unit 113 and the notifying unit 115 are illustrated in the figure as functional blocks, it is understood that the functions of these units may also be realized by the processing circuitry 110 as a whole, instead of being realized by discrete physical components in the processing circuitry 110. Furthermore, although the processing 110 is illustrated by one block in the figure, the electronic device 100 may include multiple processing circuitry, and the functions of the comparing unit 111, the determining unit 113 and the notifying unit 115 may be distributed to the multiple processing circuitry, so that the multiple processing circuitry operate coordinately to perform the functions.

The comparing unit 111 is configured to compare environment data acquired by a user equipment with reference data.

The environment data refers to data related to an environment in which the user equipment locates. As an example, the environment data may include image data, sound data, video data, smell data, pressure data, magnetic field data, tactile data, but the invention is not limited thereto.

The environment data may be acquired from the user equipment in various manners. For example, the user equipment may directly transmit environment data acquired in advance or in a real time manner to the information processing apparatus 100, or may provide environment data to the information processing apparatus 100 through forwarding by another equipment.

The reference data may include historical data stored in advance (which may be acquired by a same user or different users). Alternatively, the reference data may be environment data acquired by another user equipment in a real time manner, for example. The reference data may, for example, correspond to the same or similar scenario or object as the environment data acquired by the user equipment.

The determining unit 113 is configured to determine, based on a comparison result of the comparing unit 111, an adjustment for an acquisition manner of the environment data.

As an example, the adjustment for the acquisition manner of the environment data may include changing a position, an angle, a parameter setting, etc., of the user equipment acquiring the environment data.

According to an embodiment, the adjustment determined by the determining unit 113 may include changing a data acquisition parameter for acquiring the environment data.

Specifically, the determining unit 113 may determine a data acquisition parameter corresponding to environment data obtaining a high appraisal as a target parameter, based on user appraisals obtained by previous environment data.

The notifying unit 115 is configured to perform a control to notify the user equipment of indication information related to the adjustment determined by the determining unit 113.

Taking image data as an example, the indication information related to the adjustment may include indicating the user to capture a new image with a capturing location, capturing angle and capturing parameter (such as an aperture) different from the previous capturing location, capturing angle and capturing parameter, so as to improve the quality or effect of the capture, or indicating the user to provide an image of an object or a scenario at a desired location or angle, so as to obtain a more complete and comprehensive image of the object or scenario.

Figure 2:
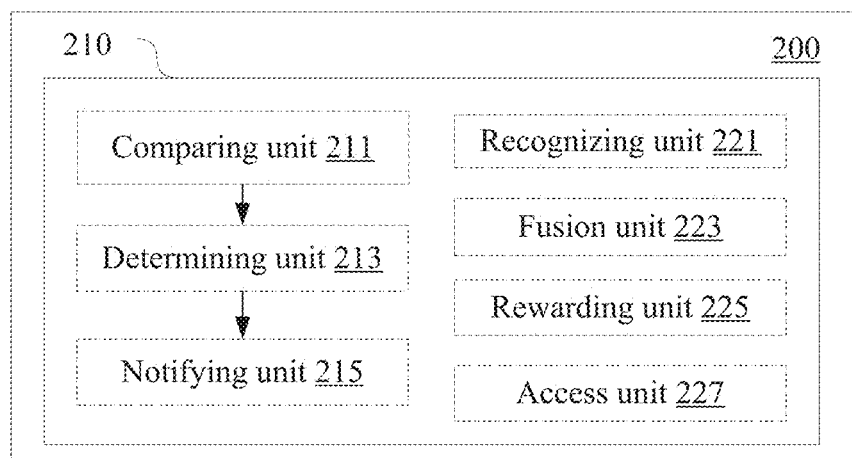
FIG. 2 is a block diagram showing a configuration example of an information processing apparatus according to another embodiment.

Referring to FIG. 2, processing circuitry 210 of an information processing apparatus 200 according to an embodiment may include an recognizing unit 221 in addition to a comparing unit 211, a determining unit 213 and a notifying unit 215 which are similar to the comparing unit 111, the determining unit 113 and the notifying unit 115 described above with reference to the FIG. 1.

The recognizing unit 221 may be configured to recognize environment data associated with a same scenario from environment data acquired by one or more user equipments.

According to a specific embodiment, the recognizing unit 221 may be configured to perform clustering on environment data acquired by the one or more user equipments, and recognize the environment data clustered into a same group as being associated with the same scenario.

For example, the recognizing unit 221 may extract a feature from the environment data (taking image data as an example, a texture feature, a shape feature, a color feature and the like may be extracted), and cluster the environment data into several groups based on the extracted features using an existing clustering method.

According to an embodiment, the recognizing unit 211 may be configured to recognize the environment data associated with the same scenario based on acquisition time, acquisition position and the like of the environment data, in addition to the feature of the environment data. The acquisition time, acquisition position and the like of the environment data may be provided together with the environment data by the user equipment acquiring the environment data to the information processing apparatus according to the present embodiment.

Accordingly, the information processing apparatus according to an embodiment may be configured to acquire from the user equipment one or more of: a time of acquiring the environment data, a position of the user equipment when acquiring the environment data, and an orientation of the user equipment when acquiring the environment data.

In an example where the user equipment is implemented as a smart phone, the time of acquiring the environment data may be determined by a clock of the smart phone, a position of the user equipment when acquiring the environment data may be determined by a GPS (Global Positioning System) unit of the smart phone, and the an orientation of the user equipment when acquiring the environment data may be determined by a gyro sensor of the smart phone.

As shown in FIG. 2, according to an embodiment, the processing circuitry 210 of the information processing apparatus 200 may further include a fusion unit 223.

The fusion unit 223 may be configured to perform a fusion on the environment data recognized as being associated with the same scenario by the recognizing unit 211.

As an example, in a case where the environment includes image data, the fusion unit 223 may generate, based on image data recognized as being associated with the same scenario, a three-dimensional image or a panoramic image of the scenario. Alternatively, the fusion unit 223 may generate, based on video data recognized as being associated with the same scenario, panoramic video or stereoscopic video of the scenario.

In an example of generating a three-dimensional image, a left-eye view and a right-eye view may be obtained based on images (which may be acquired by a same user equipment or by different user equipments) of the same object or scenario acquired at different locations and angles, so as to form a three-dimensional stereoscopic view of the object or scenario, for example.

In an example of generating a panoramic image, images of the same object or scenario acquired at different locations and angles (which may be acquired by a same user equipment or by different user equipments) may be processed by an existing splicing or fusion technology to generate an image of the object or scenario with a larger view angle.

As another example, the fusion unit 223 may generate, based on environment data recognized as being associated with the same scenario, virtual reality data or augmented reality data of the scenario. The virtual reality data may include not only the image data, but also the above-mentioned sound data, video data, smell data, pressure data, magnetic field data, and tactile data, etc. It is noted that, with the development of sensing technology and the presentation technology, the environment data for generating, for example, the virtual reality data may include other types of data which are not mentioned in the present disclosure.

In addition, according to an embodiment, the fusion unit 223 may be configured to select, based on data quality, candidate data from the environment data associated with the same scenario, and perform the fusion using the selected candidate data, so as to further improve the quality of the fused data.

As shown in FIG. 2, according to an embodiment, the processing circuitry 210 of the information processing apparatus 200 may further include a rewarding unit 225. The rewarding unit 225 is configured to perform a control to give a reward to a user who has provided the environment data for the fusion.

As an example, the reward may include virtual currency.

As shown in FIG. 2, according to an embodiment, the processing circuitry 210 of the information processing apparatus 200 may further include an access unit 227. The access unit 227 is configured to perform a control to provide the user equipment with an access to the fused environment data.

For example, the user may be allowed to access the three-dimensional image, the panoramic image, or the virtual reality data generated by the fusion. In addition, the user accessing the fused data may be required to pay a corresponding amount of fee, such as the virtual currency.

In addition, for certain events, such as a car accident, an appearance of a public figure, a show or the like, many people may capture the event and share it on various medium using mobile phones, for other people to watch. In order to improve the transmission efficiency of uploading by multiple user equipments at the same time, the information processing apparatus according to an embodiment may receive environment data collaboratively transmitted by the users.

Figure 3:
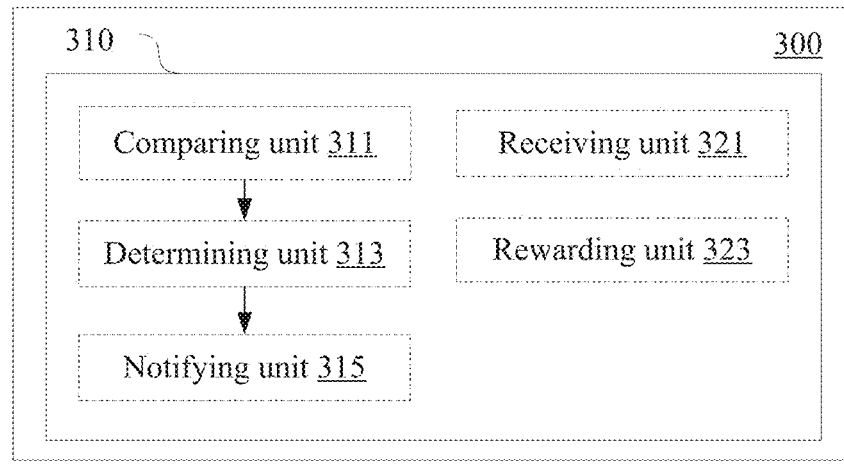
FIG. 3 is a block diagram showing a configuration example of an information processing apparatus according to yet another embodiment.

As shown in FIG. 3, processing circuitry 310 of an information processing apparatus 300 according to an embodiment may include an receiving unit 321 in addition to a comparing unit 311, a determining unit 313 and a notifying unit 315 which are similar to the comparing unit 111, the determining unit 113 and the notifying unit 115 described above with reference to the FIG. 1.

The receiving unit 321 is configured to perform a control to receive environment data collaboratively transmitted by two or more user equipments. In the collaborative transmission, one user equipment forwards environment data received using a proximity-based service communication from another user equipment.

As an example, a collaborative terminal may be discovered with reference to the following manners.

Manner A

When a terminal has data to be uploaded but has a low flow rate or has no network connection, the terminal may search in neighborhood for a device which has a storage function and can provide network connection for now or for a period in future, which is referred to as an assistant device. The searching may be implemented by broadcast signaling (beacon). The terminal device (source device) may periodically transmit distributed transmission terminal request signaling. The user may preset a condition for selecting an assistance device based on applications, and include the selection condition in the distributed transmission terminal request signaling to transmit to other terminals. In the selection condition, for example, the user may set that, an assistance device needs to have a flow rate greater than 1 Mbits/S and is capable of providing a network connection in 30 minutes according to an averaged history record if it cannot provide a network connection immediately. According to the conditions, distribution transmission control apparatuses of terminal devices in the neighborhood determine whether they meet the condition to participate in the distribution transmission set by the user, according to history information of network connection of the devices.

If an assistant device in the neighborhood that receives the request information meets the condition set by the user, it transmits corresponding feedback signaling. The feedback information may include by is not limited to at least one of memory capacity of the assistance device and statistical information on network connection.

Manner B

When a terminal has data to be uploaded, the terminal broadcasts signaling to notify devices in neighborhood that data in the terminal can be read.

Transmission configuration may be performed after a collaborative user is found. A transmission parameter may be set by a collaboration control apparatus, which may be provided on the public network side or installed in the terminal. In the transmission configuration, the part of traffic of the source terminal to be transmitted by the collaborative user is determined based on external network resources and internal network resources of the source terminal and collaborative terminal. In addition, the transmission setting also includes various settings for the collaborative terminal to communicate with other terminals using internal network after finishing the transmission, such as settings of routing and transmission time (the time sequence of transmission by the terminals).

In addition, as shown in FIG. 3, the processing circuitry 310 may further include a rewarding unit 323 according to an embodiment, which is configured to perform a control to give a reward to a user who has performed the forwarding. For example, the reward may include virtual currency.

Figure 11:
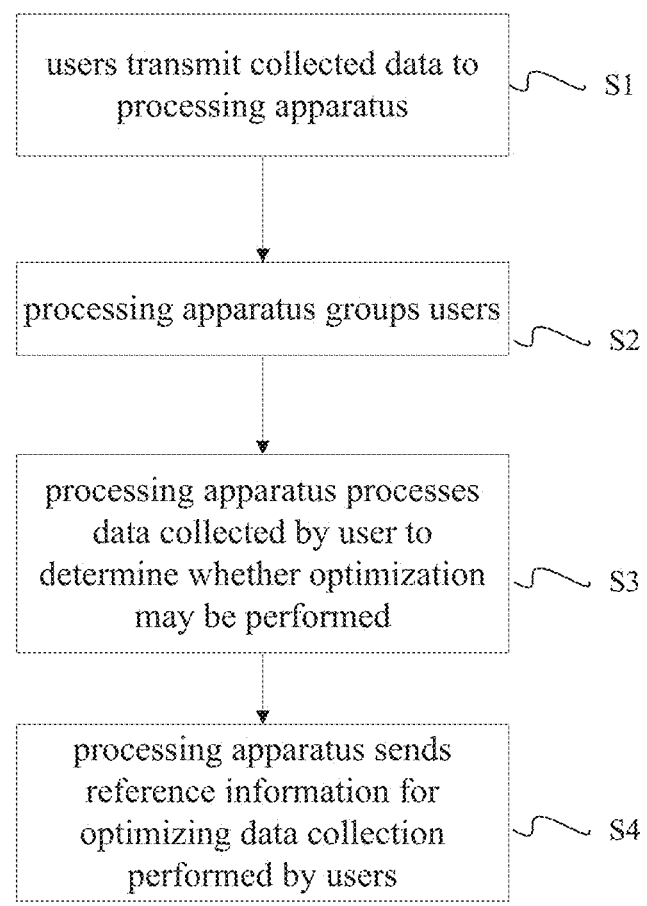
FIG. 11 is a flowchart for illustrating an information processing procedure according to an exemplary embodiment.

Next, a process of an exemplary embodiment is described with reference to FIG. 11, as a summary of various aspects of the above embodiments. It is noted that, an embodiment of the present invention may not include all the aspects of the exemplary embodiment.

First, a user captures an event and transmits the captured image to an information processing apparatus (S1). In this case, the information of location and direction of the camera may be determined using a positioning function of the user equipment, and provided together with the image. Furthermore, the user may provide information to indicate whether the image is to participate in an information fusion.

Preferably, a remote server may determine a transmission speed of the user equipment after receiving the data.

A processing apparatus may determine whether there are multiple users capturing a same event, based on information of time, location and orientation of transmission of the data by the users, so as to group the users (S2).

The processing apparatus gathers the information collected by the users, and determines whether an information collection result meets a requirement (S3), such as data amount and signal-to-noise rate.

In a case where one user at a location performs data collection, or multiple users perform data collection but do not participate in the information fusion, it is preferred to determine, based on information collection manner and collection result recorded in history information, whether the collection manner used by the user can be improved. For example, if it is recorded in the history information that a photo taken by a camera of a user at a certain location using a certain aperture has gained the most appraisals on the Internet, the processing apparatus may provide the capturing information of this photo as an optimal capturing parameter setting reference for the current user to capture a photo.

In the case that multiple users participate in the data collection, the remote server may determine which ones of the users capture the same event, based on the captured content and geographical location information of the users. For example, photos are classified using a deep learning algorithm, and users capturing the same event are grouped together.

The remote server selects users to be required to upload video from the users who capture around the same event. For example, the selected users may be users who capture contents that are mostly not repeated. The determination may be performed by an existing image processing algorithm.

Preferably, users who have high transmission speeds may be selected from the users who are not required to upload data, and controlled to establish network connection with the devices of the users who are required to upload data. For example, each user who is not required to upload data establishes a D2D connection with a user who is required to upload data (by using a D2D network of 3GPP or a WiFi network).

The user who is required to upload image may upload a part of a captured image through a user connected thereto. The remote server combines the data.

The remote server may splice the received images captured at different angles to form a panoramic image according to the angles by using an existing image matching algorithm, for example.

The processing apparatus sends a proposed reference setting of the capturing camera to the user, so that the user may adjust the camera to optimize the capturing effect (S4).

Figure 12A:
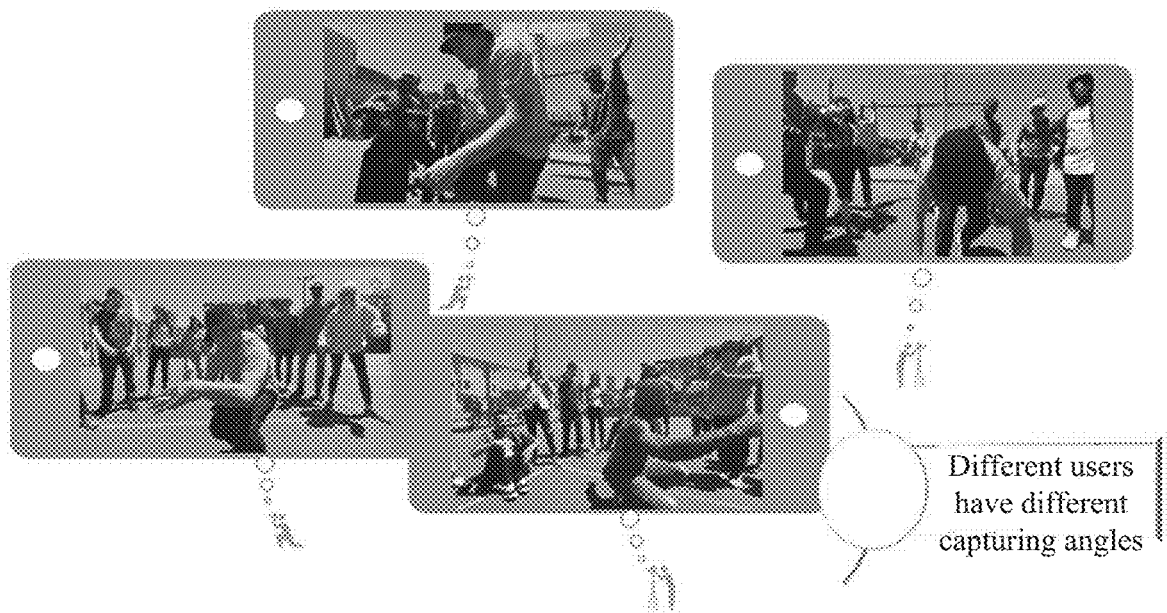
FIGS. 12A to 12E show an example of a procedure of acquiring panoramic video by multiple user equipments.
Figure 12B:
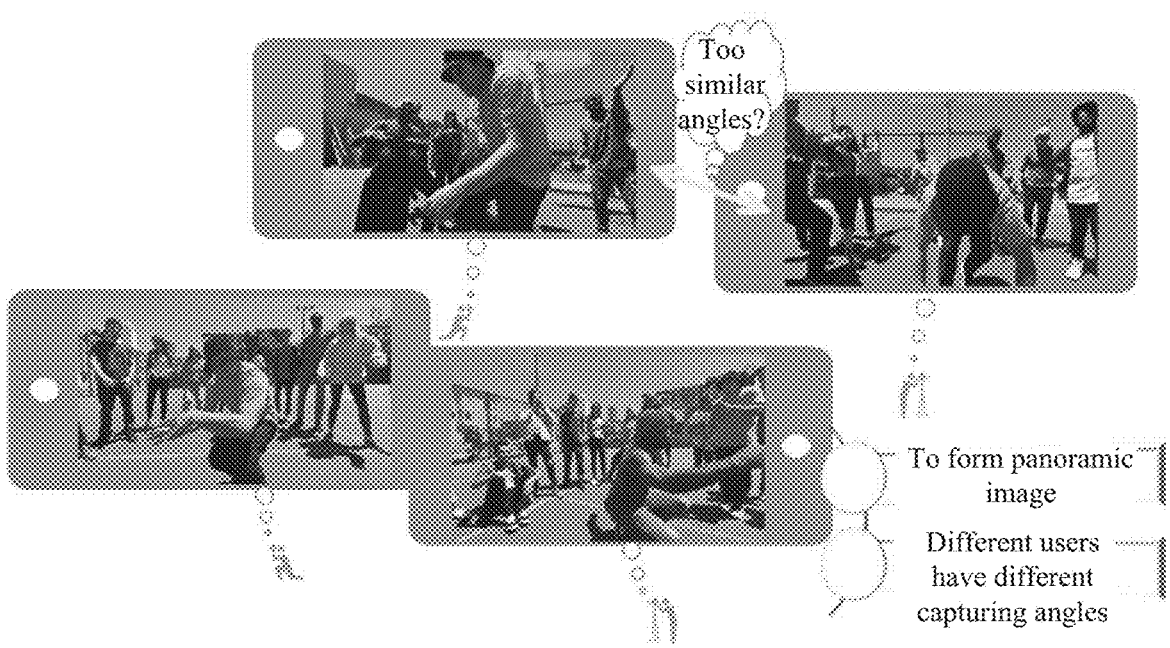
Figure 12C:
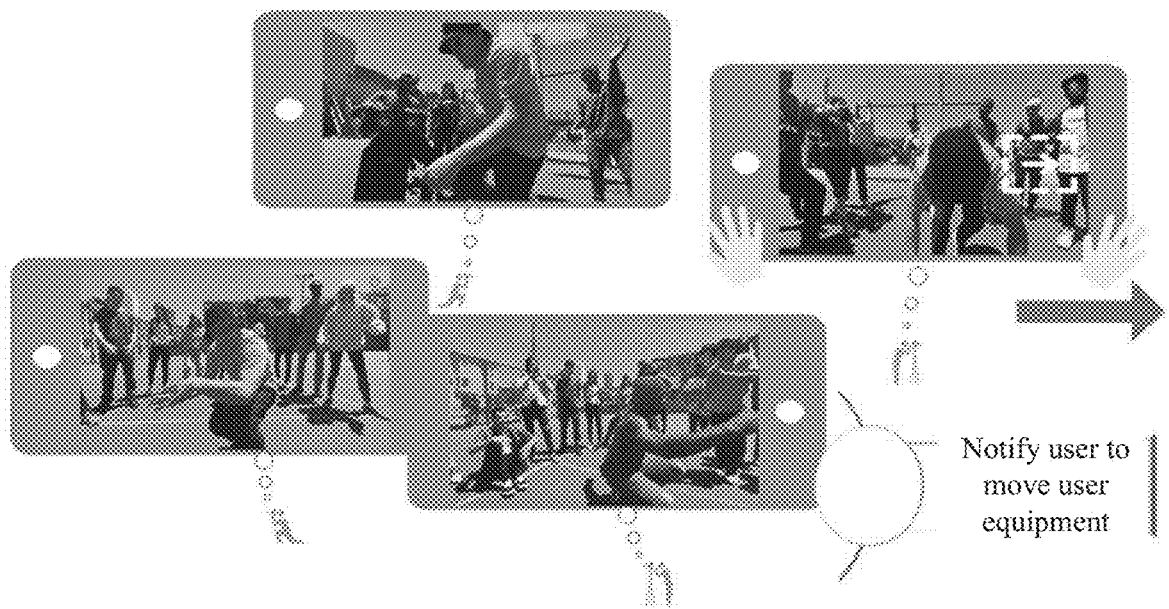
Figure 12D:
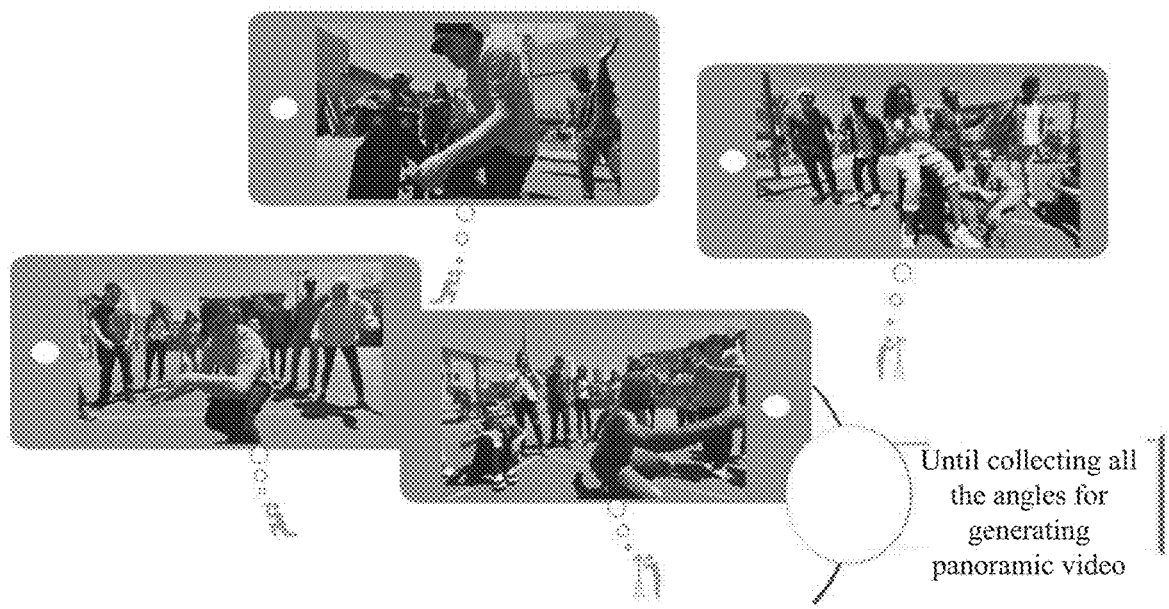
Figure 12E:
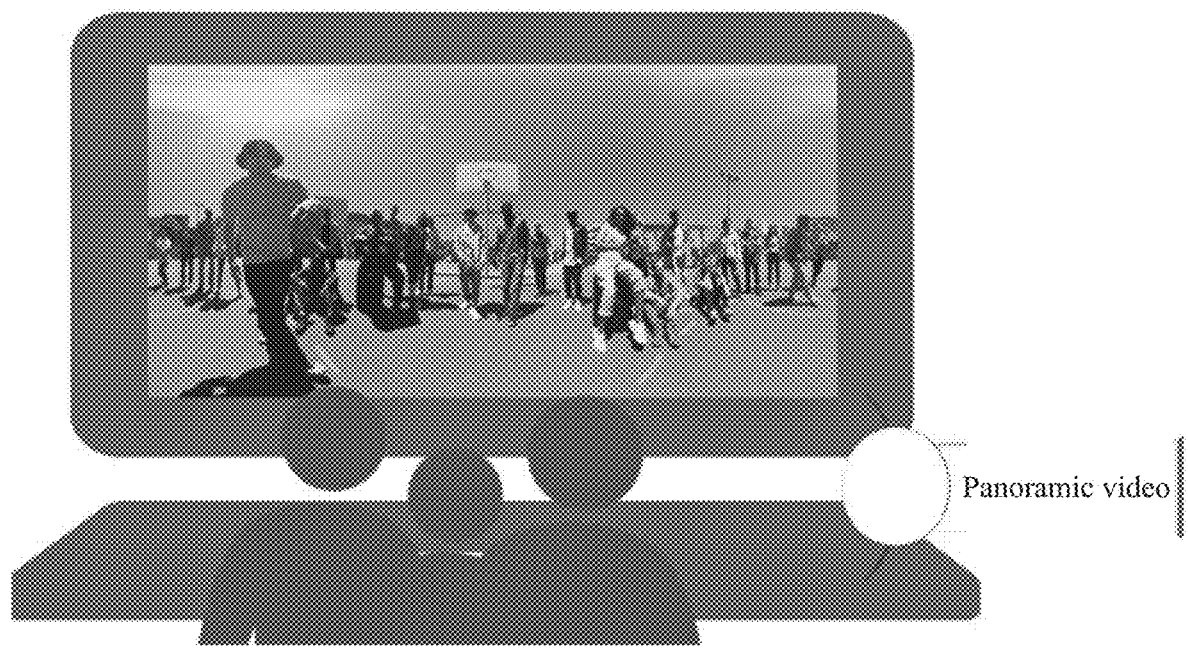

Preferably, a capturing proposal is sent to the user based on the picture captured by the user, to improve the effect of the panoramic picture. By using an image processing algorithm, the central management apparatus may determine an overlapping part of the pictures and then determine how to adjust the camera to cover a largest scope. For example, FIG. 12A to FIG. 12E show an example where multiple user equipments acquire videos of the same scenario and a panoramic video of the scenario is generated based on the videos obtained by the multiple user equipments. As shown in FIG. 12A, the multiple users capture the same scenario, for example, at multiple locations and angles. Based on the overlap between the pictures, the central processing device may expect a user equipment to adjust its capturing location or angle, so as to capture a region that is not captured by the other user equipments. For example, when it is determined that two user equipment has similar capturing angle (as shown in FIG. 12B), one of the user equipments may be controlled to display indication information, such as an arrow displayed in the screen as shown in FIG. 12C, to notify the user to move the user equipment. The user may move the user equipment according to the indication information to capture a part of the scenario that is not captured by the other user equipments, as shown in FIG. 12D. In this way, the central processing apparatus can fuse videos captured by the multiple user equipments to generate a stereoscopic video or image of the scenario, as shown in FIG. 12E.

Furthermore, after finishing the data fusion, the central processing apparatus may publish the final video or image on the Internet. The user may access the Internet to view the captured content. For example, it is required to pay with virtual currency for viewing the content. After the central processing apparatus fuses the images, the users who participate in the collaborative capture and transmission may obtain virtual currency, so as to pay for viewing the video.

In describing the above information processing apparatuses according to the embodiments of the present disclosure, obviously, some processing and methods are also disclosed. Hereinafter, a description of information processing methods according to embodiments of the present disclosure is given without repeating some details described above.

Figure 4:
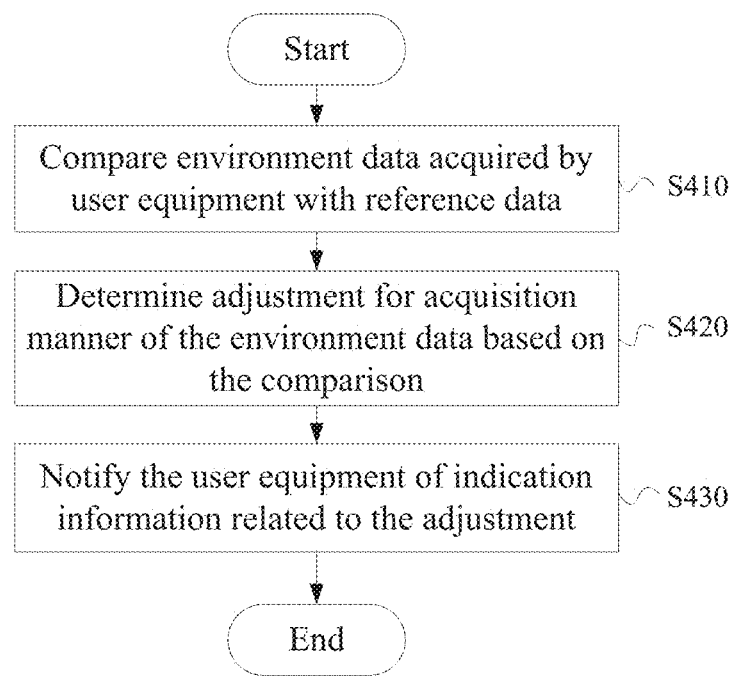
FIG. 4 is a flowchart showing a process example of an information processing method according to an embodiment of the present disclosure.

As shown in FIG. 4, an information processing method according to an embodiment includes the following steps.

In step S410, environment data acquired by a user equipment is compared with reference data.

In step S420, an adjustment for an acquisition manner of the environment data is determined based on the comparison.

In step S430, indication information related to the adjustment is notified to the user equipment.

According to another embodiment, the information processing method may include the following steps: receiving environment data associated with a scenario and acquired by multiple user equipments, the environment data acquired by the multiple user equipments being at least partially different; determining the scenario; and fusing, based on the determined scenario, the environment data acquired by the multiple user equipments to generate scenario information.

The scenario information may include but is not limited to one or more of a three-dimensional image, a panoramic image, a panoramic video, a stereoscopic video, virtual reality data and augmented reality data of an event or scenario. By fusing multiple types of environment data, more abundant and complete information of the event/scenario can be obtained and thus can be applied to various applications, such as hotspot event publication, and multi-user virtual game.

Furthermore, an electronic device for the user equipment side is also provided according to an embodiment of the present disclosure.

Figure 5:
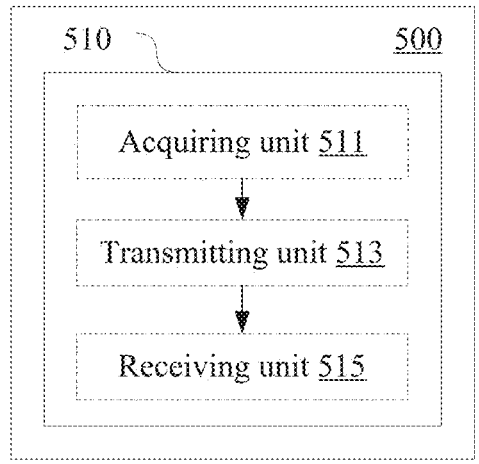
FIG. 5 is a block diagram showing a configuration example of an electronic device for user equipment side according to an embodiment of the present disclosure.

As shown in FIG. 5, an electronic device 500 for the user equipment side according to an embodiment includes processing circuitry 510. The processing circuitry 510 includes an acquiring unit 511, a transmitting unit 513 and a receiving unit 515.

The acquiring unit 511 is configured perform a control to acquire environment data. As described above, the environment data may include one or more of image data, sound data, video data, smell data, pressure data, magnetic field data, and tactile data, but the invention is not limited thereto. The environment data may be acquired by a sensor provided on the user equipment, but the inventions is not limited thereto. For example, some environment data may be provided by sensing and describing by the user himself/herself.

The transmitting unit 513 is configured to perform a control to transmit the acquired environment data to a control node (such as the information processing apparatus described above).

The receiving unit 515 is configured to perform a control to receive, from the control node, indication information related to an adjustment of an acquisition manner of the environment data. The adjustment is determined based on a comparison between the environment data and reference data.

Furthermore, according to another embodiment, the receiving unit 515 may be configured to perform a control to transmit the environment data collaboratively with another user equipment. In the collaborative transmission, one user equipment forwards environment data received using a proximity-based service communication from another user equipment.

Furthermore, according to an embodiment, the receiving unit 515 may be configured to perform a control to report to the control node, or to broadcast to another user equipment, a message indicating a predetermined event.

Figure 6:
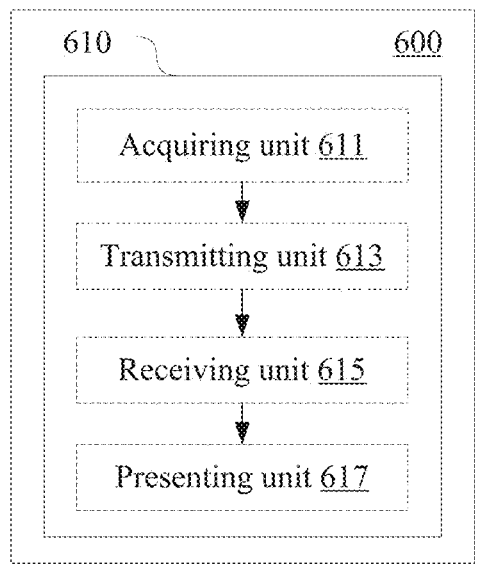
FIG. 6 is a block diagram showing a configuration example of an electronic device for user equipment side according to another embodiment.

FIG. 6 shows a configuration example of an electronic device for user equipment side according to another embodiment. The processing unit of the electronic device 600 as shown in FIG. 6 further includes a presenting unit 617, in addition to an acquiring unit 611, a transmitting unit 613 and a receiving unit 615 which are similar to the acquiring unit 511, the transmitting unit 513 and the receiving unit 515.

The presenting unit 617 is configured to perform a control to present indication information received by the receiving unit 615. The presenting unit 617 may present the indication information received by the receiving unit 615 by means of, but not limited to, image, text, voice or the like.

Figure 13:
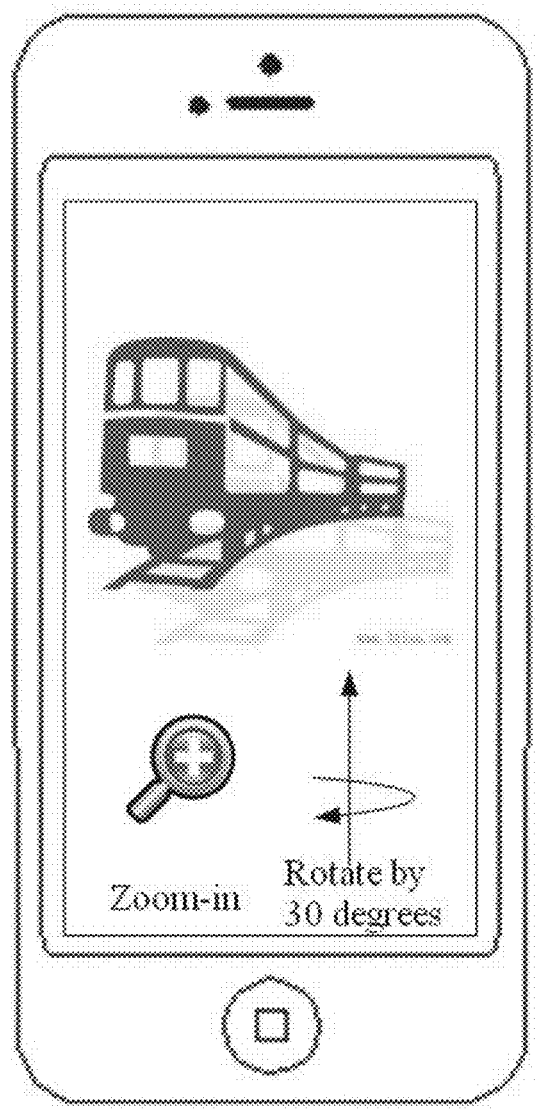
FIG. 13 shows an example of presenting an adjustment indication.

FIG. 13 shows an example of presented indication information. As shown in FIG. 13, a zoom-in indication and a rotation indication are displayed on a screen of a user equipment while the user equipment is capturing. In addition, the screen may also display indication information corresponding to various adjustment manners, such as zoom-in, zoom-out, translation (upward, downward, leftward, rightward, or the like), rotation (about a horizontal axis, a vertical axis or the like).

Figure 7:
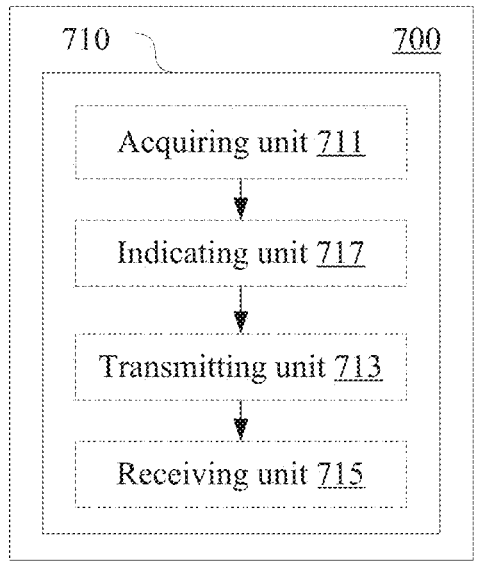
FIG. 7 is a block diagram showing a configuration example of an electronic device for user equipment side according to yet another embodiment.

FIG. 7 shows a configuration example of an electronic device for user equipment side according to another embodiment. The processing unit of the electronic device 700 as shown in FIG. 7 further includes an indicating unit 717, in addition to an acquiring unit 711, a transmitting unit 713 and a receiving unit 715 which are similar to the acquiring unit 511, the transmitting unit 513 and the receiving unit 515.

The indicating unit 717 is configured to perform a control to indicate, to the control node, whether the environment data is to participate in a fusion.

Figure 8:
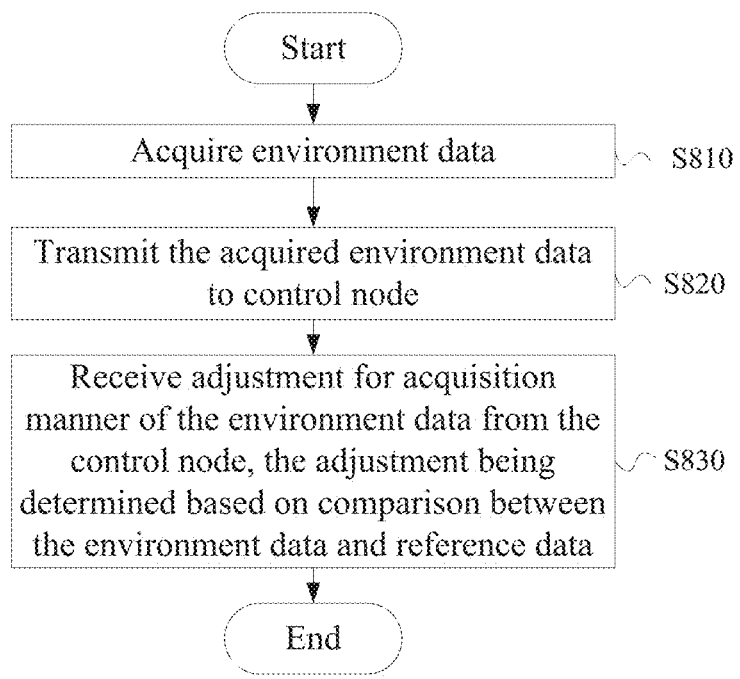
FIG. 8 is a flowchart showing a process example of an information processing method for user equipment side according to an embodiment of the present disclosure.

FIG. 8 shows a procedure example of an information processing method for user equipment side according to another embodiment. The procedure includes the following steps.

In step S810, environment data is acquired.

In step S820, the acquired environment data is transmitted to a control node.

In step S830, indication information related to an adjustment for an acquisition manner of the environment data is received from the control node. The adjustment is determined based on a comparison between the environment data and reference data.

In addition, a computer readable medium is also provided according to an embodiment of the present disclosure, which includes executable instructions that, when executed by an information processing apparatus, cause the information processing apparatus to implement the methods according to the above embodiments.

Figure 9:
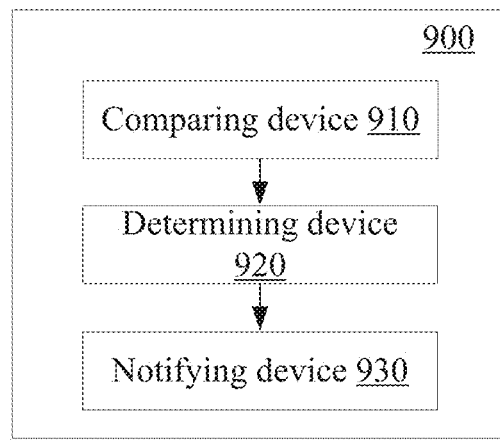
FIG. 9 is a block diagram showing a configuration example of an information processing apparatus according to an embodiment.

FIG. 9 shows an information processing apparatus 900 according to an embodiment, which includes a comparing device 910 configured to compare environment data acquired by a user equipment with reference data, a determining device 920 configured to determine, based on the comparison, an adjustment for an acquisition manner of the environment data, and a notifying device 930 configured to perform a control to notify the user equipment of indication information related to the adjustment.

Figure 10:
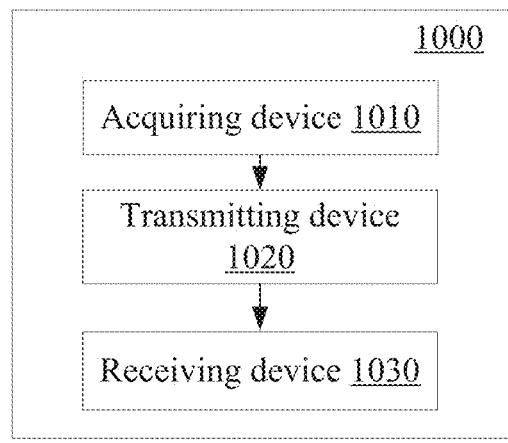
FIG. 10 is a block diagram showing a configuration example of an information processing apparatus according to another embodiment.

FIG. 10 shows an information processing apparatus 1000 according to an embodiment, which includes an acquiring device 1010 configured to acquire environment data, a transmitting device 1020 configured to transmit the acquired environment data to a control node, and a receiving device 1030 configured to receive, from the control node, indication information related to an adjustment of an acquisition manner of the environment data. The adjustment is determined based on a comparison between the environment data and reference data.

As an example, the steps of the above methods and the modules of the above apparatuses may be realized by software, firmware, hardware, or a combination thereof. In the case of implementing by software or firmware, a program constituting the software for implementing the above methods is installed in a computer with a dedicated hardware structure (such as the general computer 2000 shown in FIG. 14) from a storage medium or network, where the computer is capable of implementing various functions when installed with various programs.

Figure 14:
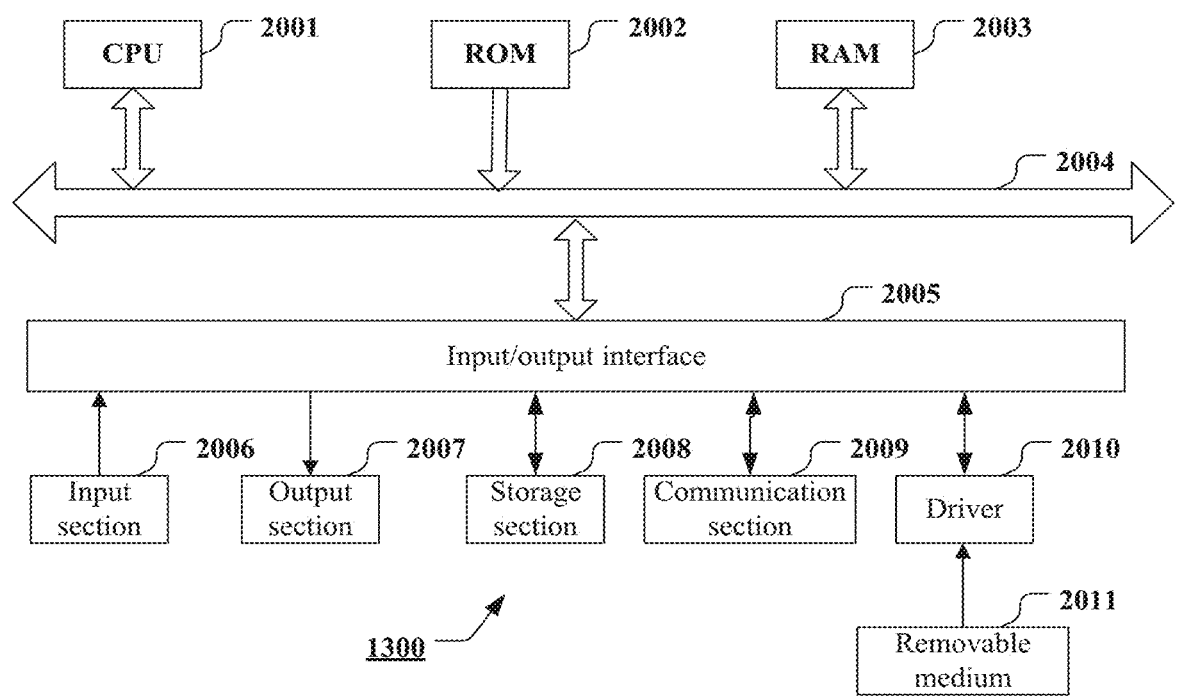
FIG. 14 is a block diagram of an exemplary structure of a computer which can implement the methods and apparatuses according to the present disclosure.

In FIG. 14, a computation processing unit (CPU) 2001 executes various processing according to a program stored in a read-only memory (ROM) 2002 or a program loaded to a random access memory (RAM) 2003 from a storage section 2008. The data needed for the various processing of the CPU 2001 may be stored in the RAM 2003 as needed. The CPU 2001, the ROM 2002 and the RAM 2003 are linked with each other via a bus 2004. An input/output interface 2005 is also linked to the bus 2004.

The following components are linked to the input/output interface 2005: an input section 2006 (including a keyboard, a mouse and the like), an output section 2007 (including displays such as a cathode ray tube (CRT), a liquid crystal display (LCD), a loudspeaker and the like), a storage section 2008 (including hard disc and the like), and a communication section 2009 (including a network interface card such as a LAN card, modem and the like). The communication section 2009 performs communication processing via a network such as the Internet. If needed, a driver 2010 may also be linked to the input/output interface 2005. A removable medium 2011, for example, a magnetic disc, an optical disc, a magnetic optical disc, a semiconductor memory and the like, may be installed in the driver 2010, so that the computer program read therefrom is installed in the storage section 2008 as appropriate.

In the case where the foregoing series of processing is achieved by software, programs forming the software are installed from a network such as the Internet or a memory medium such as the removable medium 2011.

It should be appreciated by those skilled in the art that the memory medium is not limited to the removable medium 2011 shown in FIG. 14, which has program stored therein and is distributed separately from the apparatus so as to provide the programs to users. The removable medium 2011 may be, for example, a magnetic disc (including floppy disc (registered trademark)), a compact disc (including compact disc read-only memory (CD-ROM) and digital versatile disc (DVD), a magneto optical disc (including mini disc (MD) (registered trademark)), and a semiconductor memory. Alternatively, the memory medium may be the hard discs included in ROM 2002 and the storage section 2008 in which programs are stored, and can be distributed to users along with the device in which they are incorporated.

Moreover, the present invention further includes an embodiment of a program product in which machine-readable instruction codes are stored. The aforementioned methods according to the embodiments can be implemented when the instruction codes are read and executed by a machine.

Accordingly, a memory medium for carrying the program product in which machine-readable instruction codes are stored is also covered in the disclosure of the present invention. The memory medium includes but is not limited to soft disc, optical disc, magnetic optical disc, memory card, memory stick and the like.

The embodiments of the present invention further include the following electronic device. In a case that the electronic device is applied for the base station side, the electronic device may be implemented as a gNB of any type, and an evolved node B (eNB) such as a macro eNB and a small eNB. The small eNB may be an eNB which covers a cell smaller than a macro cell, such as a pico eNB, a micro eNB and a home (femto) eNB. Alternatively, the electronic device may be implemented as any other type of base station, such as a Node B and a base transceiver station (BTS). The electronic device may include: a main body (also referred to as base station device) configured to control the wireless communication, and one or more remote radio heads (RRH) provided at a different site from the main body. Further, various types of terminal devices to be described below may function as a base station by performing the function of the base station temporarily or semi-permanently.

In a case that the electronic device is applied for the user equipment side, the electronic device may be implemented as a mobile terminal (such as smart phone, a panel personal computer (PC), a notebook PC, a portable game terminal, a portable/dongle mobile router and a digital camera) or an on-board terminal device (such as car navigation device). Further, the electronic device may be a wireless communication module mounted on each of the above terminals (such as integrated circuit module including a single chip or multiple chips).

[Application Example of User Equipment]

Figure 15:
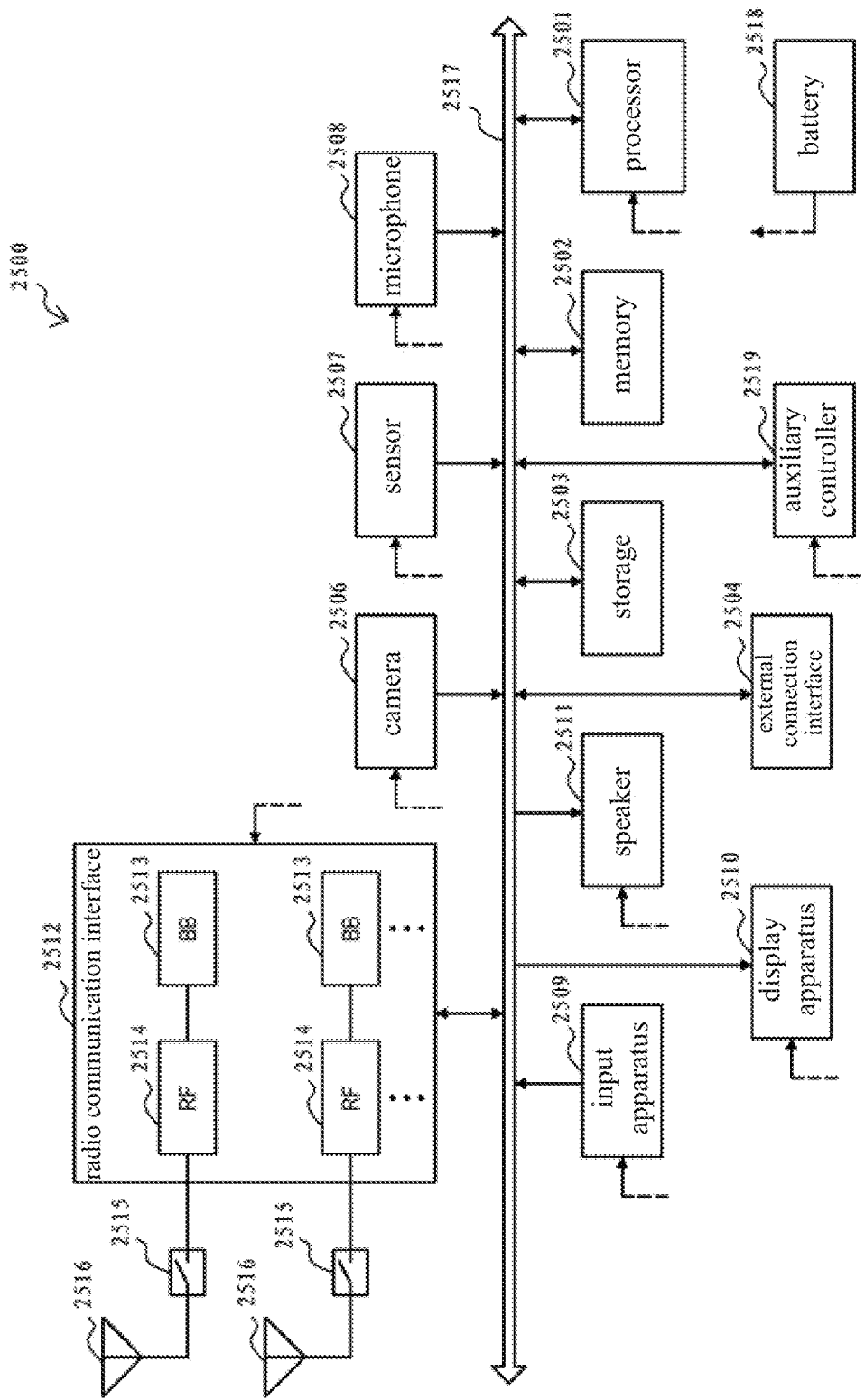
FIG. 15 is a block diagram of an example of a schematic configuration of a smart phone to which the technology according to the present disclosure can be applied.

FIG. 15 is a block diagram illustrating an example of a schematic configuration of a smartphone 2500 to which the technology of the present disclosure may be applied. The smartphone 2500 includes a processor 2501, a memory 2502, a storage 2503, an external connection interface 2504, a camera 2506, a sensor 2507, a microphone 2508, an input apparatus 2509, a display apparatus 2510, a speaker 2511, a radio communication interface 2512, one or more antenna switches 2515, one or more antennas 2516, a bus 2517, a battery 2518, and an auxiliary controller 2519.

The processor 2501 may be, for example, a CPU or a system on a chip (SoC), and controls functions of an application layer and another layer of the smartphone 2500. The memory 2502 includes RAM and ROM, and stores a program that is executed by the processor 2501, and data. The storage 2503 may include a storage medium such as a semiconductor memory and a hard disk. The external connection interface 2504 is an interface for connecting an external device (such as a memory card and a universal serial bus (USB) device) to the smartphone 2500.

The camera 2506 includes an image sensor (such as a charge coupled device (CCD) and a complementary metal oxide semiconductor (CMOS)), and generates a captured image. The sensor 2507 may include a group of sensors such as a measurement sensor, a gyro sensor, a geomagnetic sensor, and an acceleration sensor. The microphone 2508 converts sounds that are input to the smartphone 2500 to audio signals. The input apparatus 2509 includes, for example, a touch sensor configured to detect touch onto a screen of the display apparatus 2510, a keypad, a keyboard, a button, or a switch, and receives an operation or an information input from a user. The display apparatus 2510 includes a screen (such as a liquid crystal display (LCD) and an organic light-emitting diode (OLED) display), and displays an output image of the smartphone 2500. The speaker 2511 converts audio signals that are output from the smartphone 2500 to sounds.

The radio communication interface 2512 supports any cellular communication scheme (such as LET and LTE-Advanced), and performs radio communication. The radio communication interface 2512 may typically include, for example, a BB processor 2513 and an RF circuit 2514. The BB processor 2513 may perform, for example, encoding/decoding, modulating/demodulating, and multiplexing/demultiplexing, and performs various types of signal processing for radio communication. Meanwhile, the RF circuit 2514 may include, for example, a mixer, a filter, and an amplifier, and transmits and receives radio signals via the antenna 2516. The radio communication interface 2512 may be a one chip module having the BB processor 2513 and the RF circuit 2514 integrated thereon. The radio communication interface 2512 may include the multiple BB processors 2513 and the multiple RF circuits 2514, as illustrated in FIG. 15. Although FIG. 15 illustrates the example in which the radio communication interface 2512 includes the multiple BB processors 2513 and the multiple RF circuits 2514, the radio communication interface 2512 may also include a single BB processor 2513 or a single RF circuit 2514.

Furthermore, in addition to a cellular communication scheme, the radio communication interface 2512 may support another type of radio communication scheme such as a short-distance wireless communication scheme, a near field communication scheme, and a radio local area network (LAN) scheme. In that case, the radio communication interface 2512 may include the BB processor 2513 and the RF circuit 2514 for each radio communication scheme.

Each of the antenna switches 2515 switches connection destinations of the antennas 2516 among multiple circuits (such as circuits for different radio communication schemes) included in the radio communication interface 2512.

Each of the antennas 2516 includes a single or multiple antenna elements (such as multiple antenna elements included in an MIMO antenna), and is used for the radio communication interface 2512 to transmit and receive radio signals. The smartphone 2500 may include the multiple antennas 2516, as illustrated in FIG. 15. Although FIG. 15 illustrates the example in which the smartphone 2500 includes the multiple antennas 2516, the smartphone 2500 may also include a single antenna 2516.

Furthermore, the smartphone 2500 may include the antenna 2516 for each radio communication scheme. In that case, the antenna switches 2515 may be omitted from the configuration of the smartphone 2500.

The bus 2517 connects the processor 2501, the memory 2502, the storage 2503, the external connection interface 2504, the camera 2506, the sensor 2507, the microphone 2508, the input apparatus 2509, the display apparatus 2510, the speaker 2511, the radio communication interface 2512, and the auxiliary controller 2519 to each other. The battery 2518 supplies power to blocks of the smartphone 2500 illustrated in FIG. 15 via feeder lines, which are partially shown as dashed lines in the figure. The auxiliary controller 2519 operates a minimum necessary function of the smartphone 2500, for example, in a sleep mode.

In the smartphone 2500 illustrated in FIG. 15, the transceiver device of the apparatus for user equipment side according to the embodiment of the present disclosure may be implemented by the radio communication interface 2512. At least a part of the functions of the processing circuit and/or various units of the electronic device or information processing apparatus for user equipment side according to the embodiments of the present disclosure may also be implemented by the processor 2501 or the auxiliary controller 2519. For example, when the auxiliary controller 2519 performs a part of functions of the processor 2501, the power consumption of the battery 2518 can be reduced. Further, the processor 2501 or the auxiliary controller 2519 may perform at least a part of the functions of the processing circuit and/or various units of the electronic device or information processing apparatus for user equipment side according to the embodiments of the present disclosure, by executing a program stored in the memory 2502 or the storage 2503.

[Application Example of Base Station]

Figure 16:
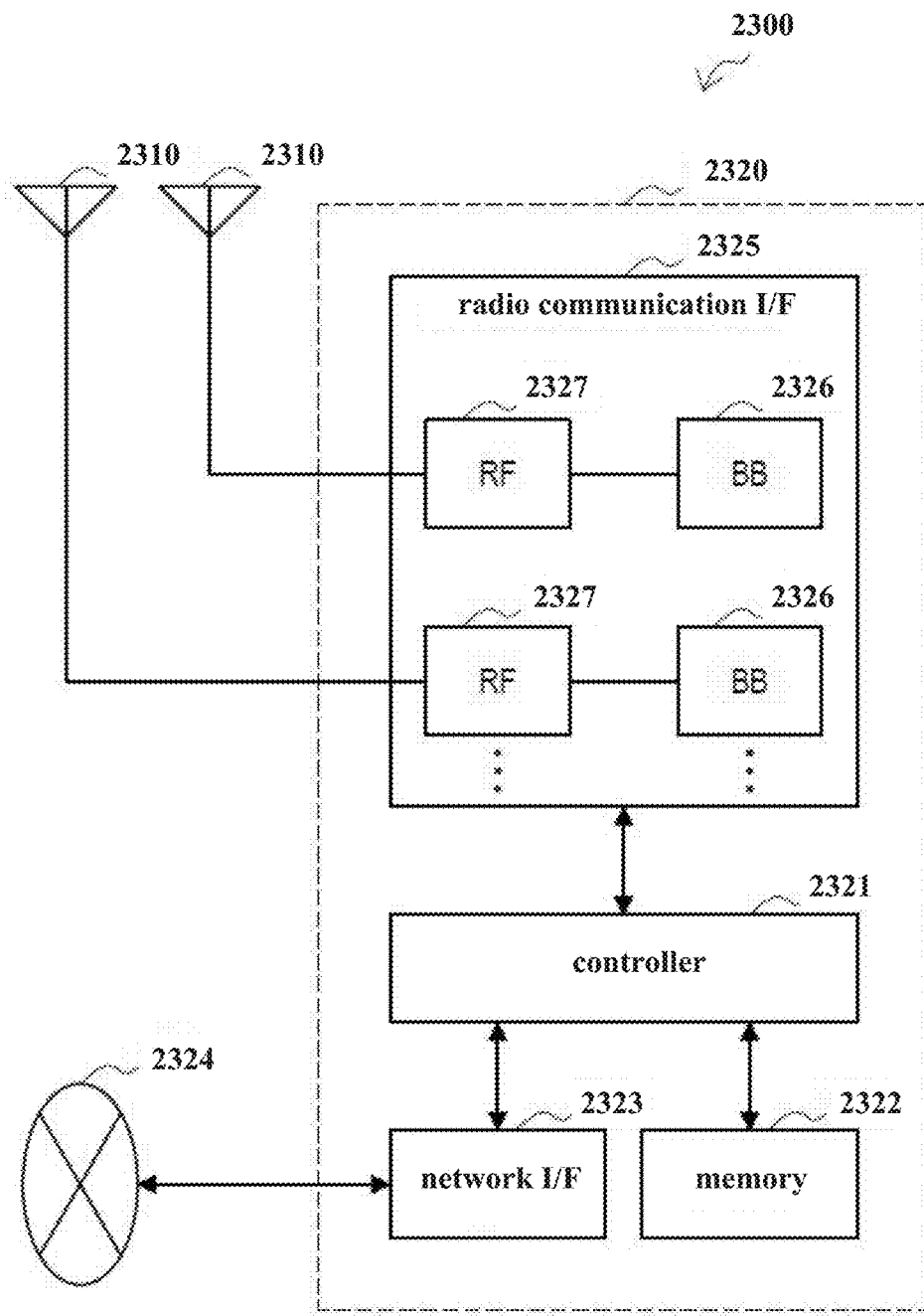
FIG. 16 is a block diagram of an example of a schematic configuration of a base station to which the technology according to the present disclosure can be applied.

FIG. 16 is a block diagram illustrating an example of a schematic configuration of a base station, such as an evolved Node B (eNB) to which the technology of the present disclosure may be applied. An eNB 2300 includes one or more antennas 2310 and a base station apparatus 2320. Each antenna 2310 and the base station apparatus 2320 may be connected to each other via a radio frequency (RF) cable.

Each of the antennas 2310 includes a single or multiple antenna elements (such as multiple antenna elements included in a multi-input and multi-output (MIMO) antenna), and is used for the base station apparatus 2320 to transmit and receive radio signals. The eNB 2300 may include the multiple antennas 2310, as illustrated in FIG. 16. For example, the multiple antennas 2310 may be compatible with multiple frequency bands used by the eNB 2300. Although FIG. 16 illustrates the example in which the eNB 2300 includes the multiple antennas 2310, the eNB 2300 may also include a single antenna 2310.

The base station apparatus 2320 includes a controller 2321, a memory 2322, a network interface 2323, and a radio communication interface 2325.

The controller 2321 may be, for example, a CPU or a DSP, and operates various functions of a higher layer of the base station apparatus 2320. For example, the controller 2321 generates a data packet from data in signals processed by the radio communication interface 2325, and transfers the generated packet via the network interface 2323. The controller 2321 may bundle data from multiple base band processors to generate the bundled packet, and transfer the generated bundled packet. The controller 2321 may have logical functions of performing control such as radio resource control, radio bearer control, mobility management, admission control, and scheduling. The control may be performed in corporation with an eNB or a core network node in the vicinity. The memory 2322 includes RAM and ROM, and stores a program that is executed by the controller 2321, and various types of control data (such as a terminal list, transmission power data, and scheduling data).

The network interface 2323 is a communication interface for connecting the base station apparatus 2320 to a core network 2324. The controller 2321 may communicate with a core network node or another eNB via the network interface 2323. In that case, the eNB 2300, and the core network node or the other eNB may be connected to each other through a logical interface (such as an S1 interface and an X2 interface). The network interface 2323 may also be a wired communication interface or a radio communication interface for radio backhaul. If the network interface 2323 is a radio communication interface, the network interface 2323 may use a higher frequency band for radio communication than a frequency band used by the radio communication interface 2325.

The radio communication interface 2325 supports any cellular communication scheme such as Long Term Evolution (LTE) and LTE-Advanced, and provides radio connection to a terminal positioned in a cell of the eNB 2300 via the antenna 2310. The radio communication interface 2325 may typically include, for example, a baseband (BB) processor 2326 and an RF circuit 2327. The BB processor 2326 may perform, for example, encoding/decoding, modulating/demodulating, and multiplexing/demultiplexing, and performs various types of signal processing of layers (such as L1, medium access control (MAC), radio link control (RLC), and a packet data convergence protocol (PDCP)). The BB processor 2326 may have a part or all of the above-described logical functions instead of the controller 2321. The BB processor 2326 may be a memory that stores a communication control program, or a module that includes a processor and a related circuit configured to execute the program. Updating the program may allow the functions of the BB processor 2326 to be changed. The module may be a card or a blade that is inserted into a slot of the base station apparatus 2320. Alternatively, the module may also be a chip that is mounted on the card or the blade. Meanwhile, the RF circuit 2327 may include, for example, a mixer, a filter, and an amplifier, and transmits and receives radio signals via the antenna 2310.

The radio communication interface 2325 may include the multiple BB processors 2326, as illustrated in FIG. 16. For example, the multiple BB processors 2326 may be compatible with multiple frequency bands used by the eNB 2300. The radio communication interface 2325 may include the multiple RF circuits 2327, as illustrated in FIG. 16. For example, the multiple RF circuits 2327 may be compatible with multiple antenna elements. Although FIG. 16 illustrates the example in which the radio communication interface 2325 includes the multiple BB processors 2326 and the multiple RF circuits 2327, the radio communication interface 2325 may also include a single BB processor 2326 or a single RF circuit 2327.

In the eNB 2300 illustrated in FIG. 16, the transceiver device of the apparatus for base station side according to the embodiments of the present disclosure may be implemented by the radio communication interface 2325. At least a part of the functions of the processing circuit and/or various units of the electronic device or information processing apparatus for base station side according to the embodiments of the present disclosure may also be implemented by the controller 2321. For example, the controller 2321 may perform at least a part of the functions of the processing circuit and/or various units of the electronic device or information processing apparatus for base station side according to the embodiments of the present disclosure, by executing a program stored in the memory 2322.

In the above description of the embodiments of the present disclosure, features described and/or illustrated in one embodiment may be applied in one or more other embodiments in a same or similar manner, or combined with features of other embodiments, or replace features of other embodiments.

It is noted that, the terms "include/comprise", when used in the description, indicate the existence of a feature, an element, a step or a unit, but does not exclude the existence or addition of one or more of other features, elements, steps or units.

In the above embodiments and examples, numerical reference signs are used to denote various steps and/or units. It is understood by those skilled in the art that these reference signs are only for convenient description and illustration, instead of indication of an order or any other limitation.

In addition, the methods in the present disclosure is not limited to be performed in the time sequence described herein, but may be performed in parallel, or independently, or in other time sequence. Therefore, the performing order of the methods described herein is not a limitation to the technical scope of the present invention.

Although the invention is disclosed with the above embodiments of the present disclosure, it is understood that, all the embodiments and examples are exemplary rather than limiting. Those skilled in the art may make various modifications, improvements or equivalents to the present invention without departing from the spirit and scope of the appending claims. All these modifications, improvements or equivalents are covered in the protection scope of the present invention.

The invention claimed is:

1. An information processing apparatus, comprising:
processing circuitry configured to:
recognize scenario environment data associated with a same scenario from environment data acquired by one or more user equipments, wherein the environment data comprises one or more of smell data or RF data;
compare the environment data acquired with reference data corresponding to a same or similar scenario or object as the environment data acquired by the one or more user equipments;
determine, based on the comparison, an adjustment for an acquisition manner of the environment data to acquire other scenario environment data associated with the same scenario from the one or more user equipments; and
perform control to notify indication information related to the adjustment to the one or more user equipments.

2. The information processing apparatus according to claim 1, wherein the processing circuitry is further configured to:
acquire a time of acquiring the environment data; and
acquire a position of the user equipment when acquiring the environment data.

3. The information processing apparatus according to claim 1, wherein the reference data comprises historical data stored in advance and/or environment data acquired by another user equipment different from the one or more user equipments.

4. The information processing apparatus according to claim 1, wherein the adjustment comprises: changing a position, an angle and/or a parameter setting of the one or more user equipments acquiring the environment data.

5. The information processing apparatus according to claim 1, wherein the adjustment comprises: changing a data acquisition parameter for acquiring the environment data.

6. The information processing apparatus according to claim 5, wherein the determination of the adjustment comprises: determining a data acquisition parameter corresponding to environment data obtaining a high appraisal as a target parameter, based on user appraisals obtained by previous environment data.

7. The information processing apparatus according to claim 1, wherein the recognition comprises:
performing clustering on the environment data acquired by the one or more user equipments, and recognizing environment data clustered into a same group as being associated with a same scenario.

8. The information processing apparatus according to claim 1, wherein the recognition comprises:
recognizing environment data associated with a same scenario based on acquisition time and/or acquisition position of environment data.

9. The information processing apparatus according to claim 1, wherein the processing circuitry is further configured to: perform a fusion on the scenario environment data recognized as being associated with the same scenario.

10. The information processing apparatus according to claim 9, wherein the processing circuitry is further configured to:
    select, based on data quality, candidate data from the scenario environment data associated with the same scenario; and
    perform the fusion using the selected candidate data.

11. The information processing apparatus according to claim 9, wherein the fusion comprises:
    generating, based on image data recognized as being associated with a same scenario, a three-dimensional image or a panoramic image of the scenario;
    generating, based on video data recognized as being associated with a same scenario, panoramic video or stereoscopic video of the scenario; or
    generating, based on environment data recognized as being associated with a same scenario, virtual reality data or augmented reality data of the scenario.

12. The information processing apparatus according to claim 9, the processing circuitry is further configured to: perform control to give a reward to a user who has provided the environment data for the fusion.

13. The information processing apparatus according to claim 12, wherein the reward comprises virtual currency.

14. The information processing apparatus according to claim 9, wherein the processing circuitry is further configured to: perform control to provide a user equipment with an access to the fused environment data.

15. The information processing apparatus according to claim 1, wherein the processing circuitry is further configured to perform control to receive environment data collaboratively transmitted by two or more user equipments,
    in the collaborative transmission, one user equipment forwarding environment data received from another user equipment using a proximity-based service communication.

16. The information processing apparatus according to claim 15, wherein the processing circuitry is further configured to perform control to give a reward to a user who has performed the forwarding.

17. An information processing method, comprising:
    recognizing scenario environment data associated with a same scenario from environment data acquired by one or more user equipments, wherein the environment data comprises one or more of smell data or RF data;
    comparing the environment data acquired with reference data corresponding to a same or similar scenario or object as the environment data acquired by the one or more user equipments;
    determining, based on the comparison, an adjustment for an acquisition manner of the environment data to acquire other scenario environment data associated with the same scenario from the one or more user equipments; and
    performing control to notify indication information related to the adjustment to the one or more user equipments.

18. An electronic device for user equipment side, comprising:
    processing circuitry configured to perform control to
    acquire environment data, wherein the environment data comprises one or more of smell data or RF data;
    transmit the acquired environment data to a control node, wherein the environment data may be recognized by the control node as being associated with a same scenario; and
    receive, from the control node, indication information related to an adjustment of an acquisition manner of the environment data to acquire other environment data associated with a same scenario,
    wherein the adjustment being determined based on a comparison of the environment data with reference data corresponding to the same or similar scenario or object as the environment data.

19. The electronic device according to claim 18, wherein the processing circuitry is further configured to perform control to present the indication information.

20. The electronic device according to claim 18, wherein the processing circuitry is further configured to perform control to indicate, to the control node, whether the environment data is to participate in a fusion.

21. The electronic device according to claim 18, wherein the processing circuitry is further configured to perform control to collaboratively transmit environment data with another user equipment,
    in the collaborative transmission, one user equipment forwarding environment data received from another user equipment using a proximity-based service communication.

22. The electronic device according to claim 18, wherein the processing circuitry is further configured to perform control to report to the control node, or to broadcast to another user equipment, a message indicating a predetermined event.

23. An information processing method for user equipment side, comprising:
    acquiring environment data, wherein the environment data comprises one or more of smell data or RF data;
    transmitting the acquired environment data to a control node, wherein the environment data may be recognized by the control node as being associated with a same scenario; and
    receiving, from the control node, indication information related to an adjustment of an acquisition manner of the environment data to acquire other environment data associated with a same scenario,
    wherein the adjustment being determined based on a comparison of the environment data with reference data corresponding to the same or similar scenario or object as the environment data.

* * * * *